United States Patent [19]
Fletcher et al.

[11] 3,883,095
[45] May 13, 1975

[54] REVERSED COWL FLAP INLET THRUST AUGMENTOR

[76] Inventors: James C. Fletcher, Administrator of the National Aeronautics and Space Administration with respect to an invention of; Dah Yu Cheng, Palo Alto, Calif.

[22] Filed: Sept. 19, 1973

[21] Appl. No.: 398,886

[52] U.S. Cl. .............................. 244/53 B; 137/15.1
[51] Int. Cl. ........................................... B64d 33/00
[58] Field of Search ......... 244/53 B; 137/15.1, 15.2; 181/33 HA

[56] References Cited
UNITED STATES PATENTS

| | | | |
|---|---|---|---|
| 2,632,295 | 3/1953 | Price | 137/15.1 |
| 3,495,605 | 2/1970 | Gunnarson et al. | 137/15.1 |
| 3,623,494 | 11/1971 | Poucher | 137/15.2 |
| 3,664,612 | 5/1972 | Skidmore et al. | 244/53 B |
| 3,750,689 | 8/1973 | Britt | 244/53 B |

FOREIGN PATENTS OR APPLICATIONS

| | | | |
|---|---|---|---|
| 1,071,234 | 11/1952 | France | 244/53 B |

*Primary Examiner*—George E. A. Halvosa
*Assistant Examiner*—Charles E. Frankfort
*Attorney, Agent, or Firm*—Darrell G. Brekke; Armand G. Morin, Sr.; John R. Manning

[57] ABSTRACT

An adjustable airfoil is described for varying the geometry of a jet inlet and an ejector inlet in a jet engine for providing thrust augmentation and noise reduction. The airfoil comprises essentially a plurality of segments which are extended radially outwardly and retracted relative to the longitudinal axis of the engine as a function of a change in the pressure differential between the upstream and downstream surfaces of the airfoil. A servo mechanism responsive to the change in the pressure differential is coupled to the airfoil to extend and retract the airfoil segments to maintain the pressure at a maximum on the downstream side of the airfoil relative to the pressure on the upstream side of the airfoil. At low speeds, such as at take-offs and landings, the airfoil is fully extended while at high speeds it is fully retracted.

9 Claims, 10 Drawing Figures

REVERSED COWL FLAP INLET THRUST AUGMENTOR

The invention described herein was made in the performance of work under a NASA contract and is subject to the provisions of Section 305 of the National Aeronautics and Space Act of 1958, Public Law 85–568 (72 Stat. 435; 42 USC 2,457).

BACKGROUND OF THE INVENTION

Jet ejectors and modified jet inlets can be used to increase thrust and also to reduce the noise of a jet engine exhaust beyond that which has been heretofore achieved. With advanced jet engines, reducing noise is becoming as important as increasing thrust. In this regard it is thus well to note that, for a given thrust level, ejector and jet inlet thrust augmentation apparatus provide a means for reducing throttle settings, which is an excellent way to reduce noise since the production of noise in a turbulent jet is proportional to the jet velocity to the eighth power.

The history of jet ejector experiments for thrust augmentation can be traced back to the early and mid-1930's, as reported by E. N. Jacobs and J. M. Shoemaker, NACA TM 431,1932; M. Roy, NACA TM 571,1930; Mélot, *Scientific American*, Vol. 134, pp.266–268, Apr. 1926; and G. B. Schubauer, NACA TM 442,1933. More recently, experimental evidence of possible thrust augmentation of up to 75% of a free jet has been reported by R. B. Fancher, ARL Rept. No. 71-0140, 1971.

Most of the analyses heretofore conducted, however, with the exception of a few reports directed specifically toward ejectors, such as H. H. Korst, A. L. Addy and W. L. Chow, *J. Aircraft*, p. 498, 30, 1966 and J. M. Mitchell, "Design Parameters for Subsonic Air-Air Ejector," TR No. 40 (ONR–090–432), are based almost exclusively on the concept of transforming kinetic energy flux of a jet into a higher momentum flux in the induced secondary air flow to increase thrust. While, theoretically at least, there is nothing essentially erroneous with the known hypotheses of inducting and mixing secondary and primary air to obtain thrust augmentation, care must be exercised in the manner in which the increased momentum is intended to impart a force on a jet so that a benefit can be obtained. Heretofore, to increase inlet and ejector performance, blow-in doors or auxiliary inlets have been used to entrain secondary air into the primary airstream of the engine to increase the air passage cross-section. Unfortunately, however, the methods and apparatus used have proved to be inefficient and noisy and have failed to produce appreciable additional thrust.

SUMMARY OF THE INVENTION

In view of the foregoing, an object of the present invention is a method and apparatus for jet engine thrust augmentation which is efficient, produces appreciable additional thrust and permits a reduction in power settings for a given thrust level to reduce noise on landings and take-offs.

In accordance with this object, a principal feature of the invention is a movable airfoil comprising a plurality of segments mounted to the inlet of a jet engine or to the inlet of an ejector mounted to an aft portion of the engine. The position of this airfoil is adjustable and servo-controlled. The airfoil is contoured to prevent the sharp turning of the streamlines around the inlet lips and functions in much the same manner as a conventional wing in providing lift in a forward longitudinal direction. As with a conventional wing, the velocity of the air entrained into the interior of the engine by the airfoil and the suction of the primary airstream is increased by the contour of the airfoil, resulting in a pressure differential across the airfoil. The resulting reduced pressure on the upstream surface and a correspondingly higher pressure on the downstream surface of the airfoil, said surfaces being defined relative to the primary airstream, results in a forwardly directed component parallel to the longitudinal axis of the engine and hence serves as a source of additional thrust.

As the forward velocity of the engine increases, however, the airfoil produces more drag than thrust. To compensate and maximize the thrust and yet minimize the drag throughout a velocity transition, the angle of the airfoil relative to the longitudinal axis of the engine and primary airstream is continuously adjusted according to the streamlines created by both the suction and forward speed of the engine.

In a cylindrical geometrical configuration, the airfoil is segmented as a practical matter and, when extended, takes on the appearance of forwardly directed overlapping cowl flaps which are adjusted mechanically in substantially the same fashion as are the cowl flaps on a radial piston engine. Pressure transducers or pressure taps leading to a pressure differential cell on the upstream and downstream surfaces of the airfoil or on the upstream surface of the airfoil and the exterior of the engine or the ejector immediately downstream of the airfoil, drive a servo motor to adjust the angle and degree of extension of the airfoil to maintain a maximum negative pressure difference between the upstream and downstream surfaces of the airfoil, respectively.

In addition to the provision for an adjustable airfoil on the inlet of an ejector to increase thrust, there is also provided an ejector having an optimum length to diameter, entrance length shape, shape loading and an optimum location relative to the primary jet stream as well as an optimum thrust to weight ratio, which factors are arrived at by an analysis of the streamlines and velocity profiles of primary and secondary fluid flows.

DESCRIPTION OF THE DRAWINGS

The above and other objects, features and advantages of the present invention will be apparent from the following detailed description in which:

FIG. 4($b$) is a plot of the velocity profiles $u$, $v$ as a function of $y$ of $y$ at an arbitrary $x$-location of the streamlines of FIG. 4($a$).

FIG. 4($c$) is a diagram of the velocity=0 line in the $y$-direction of the streamlines of FIG. 4($a$).

FIG. 4($d$) is a diagram of a model jet source and ejector.

DETAILED DESCRIPTION

Figure 1:
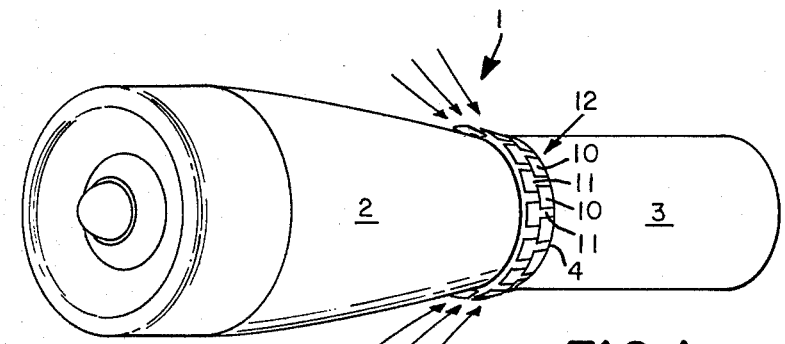
FIG. 1 is a perspective view of a jet engine assembly including an ejector in accordance with the present invention.

Referring to FIG. 1, in a first embodiment of the present invention, there is provided a jet engine assembly 1 comprising a jet engine 2 and an ejector 3. Ejector 3 is provided with a lip 4 located at its forward or input end. Interior of lip 4 there is movably mounted a plurality of overlapping, forwardly directed, flap-like members 10 and 11. Members 10 overlap members 11 and, in combination, form in a cylindrical configuration an inverted segmented airfoil 12 in the nature of a ringwing.

Figure 2:
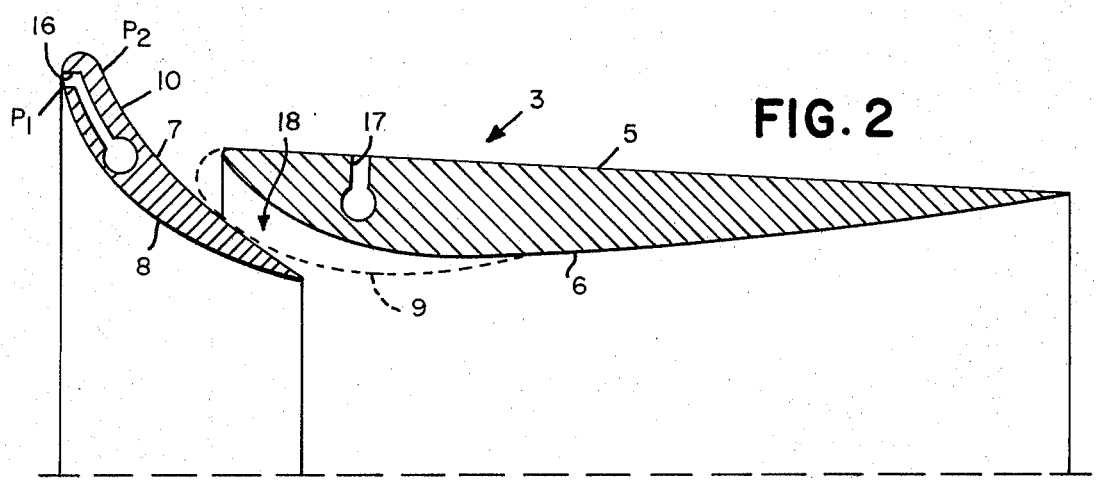
FIG. 2 is a partial cross-sectional view of a wall portion and one segment of the airfoil of the engine assembly of FIG. 1.
Figure 3:
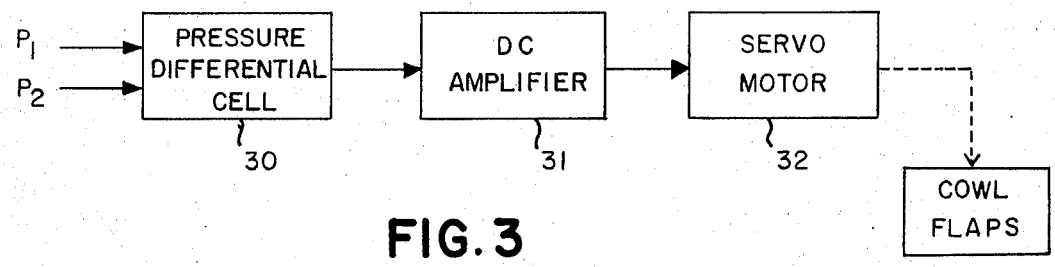
FIG. 3 is a block diagram of an electronic circuit for positioning the airfoil of the present invention.

Coupled to each of members 10 and 11 is a lever assembly (not shown) for selectively extending and retracting the members under the control of an air-pressure-responsive servo mechanism described in more detail with respect to FIGS. 2 and 3. The lever assembly for extending and retracting members 10 and 11 is any suitable assemblage of levers, as is clearly within the skill of the art to fabricate such as, for example, the lever mechanism used in extending and retracting the cowl flaps of a conventional prior-known radial piston engine, the only essential difference being that members 10 and 11 are extended in a forward direction and not in a rearward direction.

Referring to FIG. 2, one of members 10 and 11, and an associated portion of the wall of ejector 3 are shown in a partial cross-section to illustrate the general surface configuration of each of the members vis-a-vis the ejector 3 and a means used for measuring the air pressure on the upstream and downstream surfaces of the members.

As shown in FIG. 2, ejector 3 is provided with a contoured interior surface 6 and an exterior surface 5. The member 10, as shown, as is each of members 10 and 11, is provided with a contoured downstream surface 7 and a contoured upstream surface 9. Surfaces 7 and 8 are contoured in such a fashion as to complement the surface 6 of ejector 3 and to provide, when flap 10 is in a fully retracted position, as shown by dashed lines 9, a smoothly contoured surface to the gas flow through ejector 3 for providing maximum engine efficiency at high speeds. When extended, as is the case at low speeds, the surfaces 7 and 8 of flap 10 present an airfoil which creates, due to an induced exterior air flow into ejector 3, as shown in FIG. 1, a pressure differential $P_2 - P_1$ between surfaces 7 and 8, respectively.

Located in the leading edge of flap 10 there is provided an orifice 16. Downstream of flap 10 and in the wall 5 of ejector 3 there is provided another orifice 17.

Referring to FIG. 3, orifices 16 and 17 are provided to be in communication with a pressure differential cell 30 for detecting a change in the pressure differential $P_2 - P_1$ between the surfaces 5 and 8, respectively. As will be apparent, the pressure on wall 5 will be proportional to the pressure on surface 7 and hence will provide a measure of any change in the pressure differential between surfaces 7 and 8.

Coupled to the output of cell 30 through a d.c. amplifier 31 is a servo motor 32. Servo motor 32 is provided to be responsive to the output of cell 30 for extending and retracting the flaps 10 and 11 to maintain the ratio of the air pressure on the downstream surface 7 at a maximum relative to the air pressure on the upstream surface 8. As will be apparent, this pressure differential provides additional forward thrust. Alternatively, it is understood the pressure differential $P_2 - P_1$ could be detected by a pair of pressure transducers (not shown) mounted in any well known manner directly in surfaces 7 and 8, as at points $P_1$ and $P_2$, in lieu of using orifices 16 and 17.

It should be noted also that, while there is illustrated a gap or slot 18 between airfoil 10 and the surface 6 of ejector 3 when airfoil 10 is extended, the slot is not necessary for purposes of the present invention. That is, with an appropriate lever assembly, airfoil 10 may be extended and retracted with no appreciable slot created between the trailing edge of the airfoil and surface 6, and such operation will not significantly change the function of the airfoil.

Having described a preferred embodiment of the present invention, it is believed well to consider also various parameters of the novel ejector design as determined by experimentation in addition to the movable airfoil which is the principal source of thrust augmentation.

Referring to FIGS. 4(a), (b), (c) and (d), there is illustrated a jet model comprising an axially directed jet 40 issuing from a circular aperture 41 in a wall 42.

Jet 40, as shown by a single arrow extending along the x-axis in FIG. 4(a), actually comprises, as is readily shown, a radially expanding air flow which induces or entrains a secondary air flow shown by a plurality of arrows extending in the $x$ and 7-direction. A pair of dashed lines 43 and 44 are provided to represent a line along which the velocity of the secondary air flow exactly equals the velocity of the primary air flow in the y-direction and, hence, as shown in FIG. 4(c), are called $v=0$ lines, where $u$ is the velocity component in the x-direction along the lines.

Velocity profiles which confirm the location of the $v=0$ lines of the streamlines in FIG. 4(a) in the $x$ and $y$-direction are plotted in FIG. 4(b) as given by similarity solutions as follows:

$$u = \frac{3}{8\pi} \frac{K}{\epsilon_o X} \frac{1}{(1+¼\eta^2)^2} \quad (\phi, \text{axial direction}) \quad (1)$$

$$v = ¼ \sqrt{\frac{3}{\pi}} \sqrt{\frac{k}{\phi}} \frac{\eta - ¼\eta^2}{(1+¼\eta^2)^2} \quad (y, \text{radial direction}) \quad (2)$$

Where, $$\eta = ¼ \sqrt{\frac{3}{\pi}} \frac{k}{\epsilon_o} \frac{y}{\phi}$$

$$k = 2\pi \int_o^\infty u^2 \, y \, dy,$$

$\frac{\epsilon_o}{k} = C_1$ for a turbulent jet, and $\epsilon_o$ is the turbulent kinematic viscosity.

Figure 4:
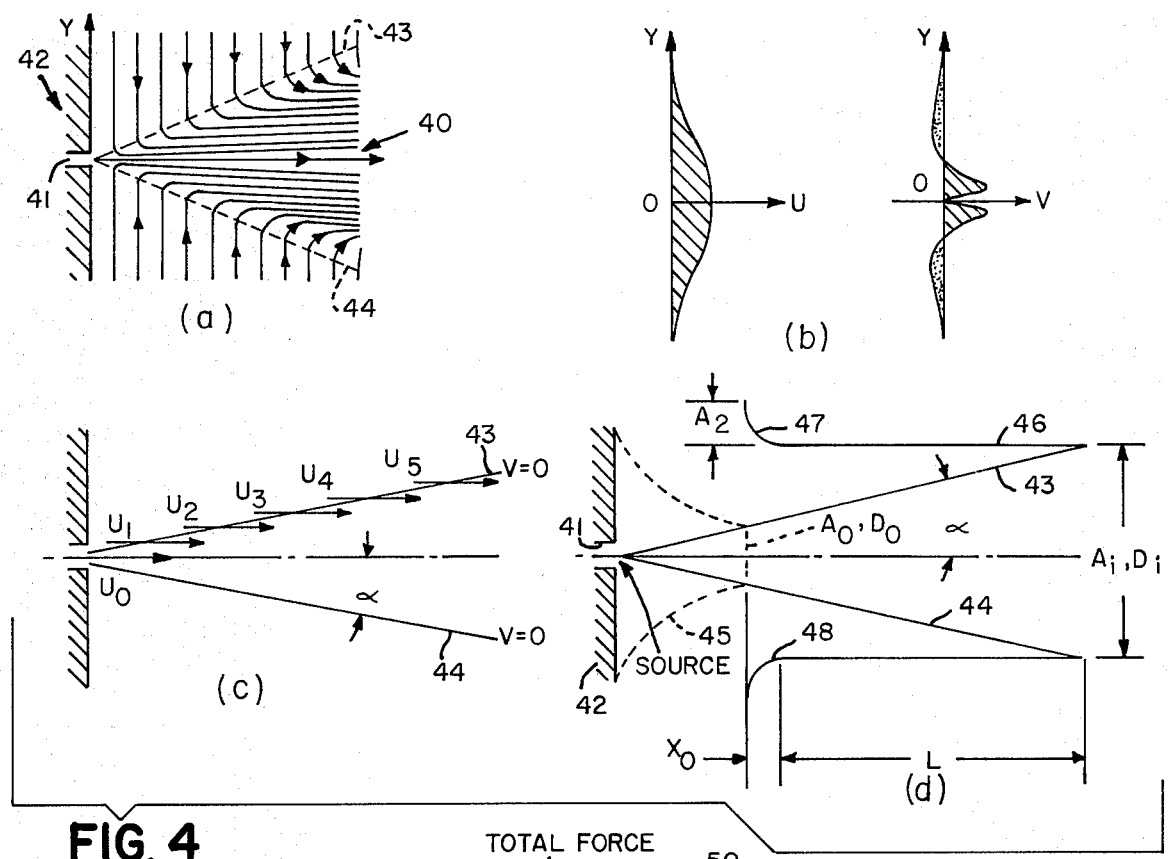
FIG. 4($a$) is a diagram of the streamlines of a circular turbulent jet.

In a subsonic flow, $C_1$ is found to be a constant and equal to 0.0161. For $C_1$ equal to 0.0161, the angle $\alpha$ between the x-axis and $v=0$ line is found to be 7.5 degrees. From this analysis it is found that, if an ejector is added to the jet having a diameter and length such that its wall extends beyond and intercepts the $v=0$ line, the excess portion of the ejector will contribute little or nothing to the ejector pumping action and will, in some cases, actually result in a drag or negative thrust due to friction at the wall. It follows therefrom that an effective ejector requires only a fixed length to diameter $L/D_i$, as shown in FIG. 4($d$).

In addition, it is known that a finite diameter jet for a real experimental case can be simulated by a jet source at an appropriate location inside a nozzle, so that the similarity solution is still valid.

Referring again to FIG. 4($d$), adjacent wall 42 there is illustrated a nozzle 45 having an area $A_o$ and a diameter $D_o$. Downstream of nozzle 45 there is provided enveloping the $v=0$ lines 43 and 44 an ejector 46 of a length L and a diameter $D_i$ and area $A_i$. At the upstream end of ejector 46 there is provided an arcuate lip 47 having a projected lip area $A_2$. The distance from the end of nozzle 45 to the throat of ejector 46 is designated $X_o$. The $v=0$ line 43 and 44 originate in aperture 41 and extend through nozzle 45. The length of ejector 46 is chosen to terminate at the point where the wall of ejector 46 intercepts the $v=0$ lines as previously described. Since air-induced flow is given by entrance Q = 0.404 $\sqrt{k\phi}$, the distance $\phi_o$ of primary nozzle 45 to the throat 48 of the ejector will change the effect of ejector streamlines around the lip.

In view of the foregoing, the optimum $L/D_i$ of the ejector $\phi_0$, and lip loading of the ejector (thrust augmentation) for maximum thrust/weight ratio of the ejector is considered.

Figure 5A:
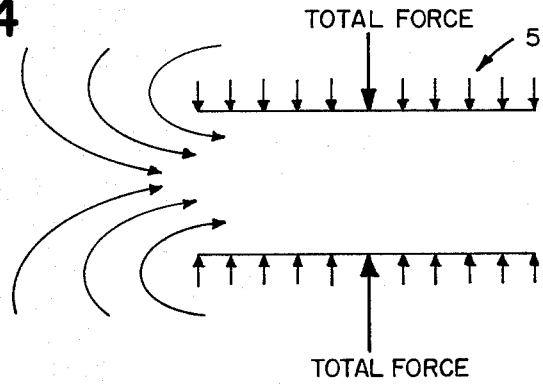
FIGS. 5(a) and 5(b) are diagrammatic representations of an ejector duct, respectively, with and without an entrance lip.
Figure 5B:
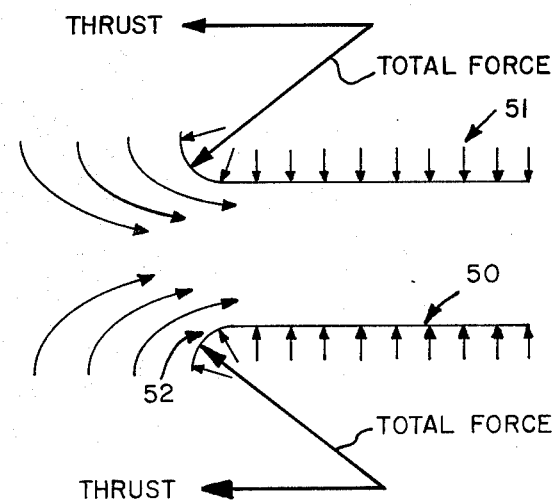

Referring to FIGS. 5($a$) and 5($b$), there is provided, by way of a diagrammatic representation, a cylindrical ejector 50 and 51. Ejector 50 is provided without a lip, and ejector 51 is provided with a lip 52 at its upstream end. A primary air flow, introduced into the upstream ends of the ejectors along the axes of the ejectors, will entrain or induce a secondary air flow about their respective upstream ends, as shown by the curved arrows. Considering the effect of thrust augmentation, it is clear from Bernoulli's principles that the inside surfaces of the ejectors are at a lower pressure than are the outside surfaces. From FIGS. 5($a$) and 5($b$), it will be seen that ejector 50 will develop no component of these pressure forces in the thrust direction while, due to lip 52, a thrust component will be developed with ejector 51 due to the lip 52. It is also clear from the previous discussion with respect to FIG. 4($d$), that larger diameter ejectors can have a greater length before the wall of the ejector will intercept the $v=0$ line. It follows, therefrom, that larger diameter ejectors will have an increased induced flow $Q_o$ in the ejector duct, which will improve thrust augmentation. Simply enlarging the diameter of an ejector, however, is found not to be the only criterion.

With the percentage of thrust augmentation defined as $$\Phi = \frac{\text{thrust increment}}{\text{free jet thrust}}$$

tests were made with straight lipless ducts as shown in FIG. 5($a$) with a constant diameter of approximately 7 inches and various ratios $L/D_i$ of 8, 4 and 2. Referring again to FIG. 4($d$), the tests indicated that with $D_o =$ 1.0 inches, and a large $L/D_i$ of 8, the friction loss on the wall of the ejector where the wall intercepted the $v=0$ line resulted in a loss of thrust and that in all other cases of lesser $L/D_i$ of 4 and 2 the percentage of thrust augmentation was negligible over a nozzle pressure range, $P_o$, of 30–70 psig. The situation was completely changed, however, when a lip was added to each of the ducts as shown in FIG. 5($b$).

At subsonic velocities, the $\alpha$ of the $v=0$ line of a turbulent jet, as previously discussed, is 7.5 degrees. In a slightly supersonic flow, $\alpha$ is expected to be smaller due to the fact that mixing is expected to be less effective. Under these conditions and with nozzle pressures at $P_o$ = 60, 40 and 30 psig, total thrusts recorded increased with increasing $L/D_i$ of about 2 to an $L/D_i$ of 5 with a maximum percentage of thrust augmentation obtained of up to 40%. The same ducts without a lip gave no thrust augmentation.

The optimum position $X_o$ of a primary jet relative to the throat of an ejector was also investigated with $D_o =$ 1 and $L/D_i = 5$ for $D_i = 2$, 5 and 7 inches at a nozzle pressure $P_o = 60$ and 40 psig. With these parameters an $X_o/D_o$ of about 2 was found to provide the best augmentation in all cases except with $D_i = 7$ inches at $P_o$ = 40 psig.

Besides finding that the optimum $X_o/D_o$ provides up to 50% thrust augmentation, it was also determined that a lower primary nozzle pressure $P_o$ can result in a higher percentage of thrust augmentation than a higher nozzle pressure. Thus, while increasing D does increase thrust augmentation, the latter is not linear with increasing D.

While total augmented thrust is proportional to the diameter of the ejector, an increase in ejector diameter alone is not necessarily an optimum choice. Jet mixing efficiency, (a function of $X_o/D_o$) which affects the entrance lip shape and the streamlines around the lip, is also an important factor. Moreover, since the jet has a slightly under-expanded supersonic velocity, the eddy viscosity $\epsilon_o$ may be different than the subsonic case. Thus, when the percentage of thrust augmentation is considered versus nozzle pressure $P_o$ at an optimum $X_o/D_o$ of 2, and $L/D_i$ of 5, it is found that $\phi$ drops off with higher nozzle pressure and that a percentage of thrust augmentation of up to 55% can be obtained with a 7-inch diameter ejector at a $P_o$ of 30 psig.

The weight W of an ejector can be estimated also for $L/D_i = 5$ with a constant wall thickness $t$ by the equation:

$$W = 2\pi D^2 (L/D) t_{pm}$$

(3)

$$= 10\pi_{pm} tD$$

While $\phi$ increases with $D_i$, as previously described, equation 3 shows that W increases as a function of $D^2$, indicating that an increase in D alone is not necessarily optimum. For example, at $p_o = 30$ psig, the quotient of the ratios of $\phi$/W for $D_i = 5$ and 7, respectively, is 1.54 without losing the merits of thrust augmentation. Thus, by restricting the size of an ejector, an optimum thrust/weight ratio can be achieved.

Since augmented thrust also depends on the manner in which the differences across the entrance lip, due to the entrained flow, are transferred to the axial direction, lip loading is also an important factor with respect to the choice of an optimum ejector diameter. Lip loading is defined as the ratio of augmented thrust to the projected lip area $A_2$ as shown in FIG. 4(d). By considering lip loading as a function of $D_i$ and $p_o$ it was determined that $D_i = 5$ and $A_2 = 0.64$ ft.$^2$ provided the optimum lip loading for all nozzle pressures in the range of 30 to 60 psig.

From the above discussion, it may be concluded that theoretical turbulent jet profiles can be used to predict closely the choice of optimum $L/D_i$, that optimum thrust augmentation depends on the streamline behavior around the lip of an ejector and that for a jet accelerating from a standstill to a high velocity, the entrance shape should be adjusted as a function of jet velocity.

Figure 6:
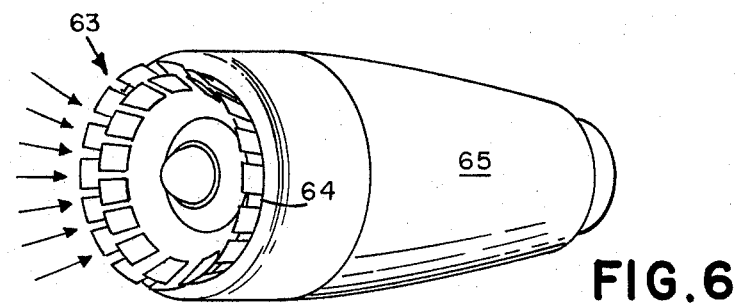
FIG. 6 is a perspective view of the airfoil of the present invention mounted at the inlet lip of a jet engine.

Since it is apparent that an adjustable airfoil on an ejector provides a means for obtaining effective thrust augmentation, the use of a substantially identical adjustable airfoil 63 on the inlet lip 64 of a jet engine 65, as shown in FIG. 6, may also provide significant thrust augmentation.

What is claimed:

1. In a jet engine assembly, an apparatus for providing thrust augmentation in a forward direction comprising:
    a controlled movable airfoil having upstream and downstream surfaces relative to said forward direction for entraining external air into the interior of said jet engine assembly and developing a thrust component along said direction of motion; and
    servo means for constantly moving said airfoil to a position that generates maximum thrust augmentation.

2. An apparatus according to claim 1 wherein said servo means comprises:
    means for detecting the pressure differential between said upstream and said downstream surfaces; and
    means responsive to said detecting means for moving said airfoil in response to said pressure differential to a position maximizing the value of said pressure differential.

3. An apparatus according to claim 2 wherein said movable airfoil comprises a plurality of airfoil segments, each having an upstream and a downstream surface, and which segments are arranged in a circle forming a cylindrical airfoil coaxial with the longitudinal axis of said jet engine assembly.

4. An apparatus according to claim 3 wherein said upstream and said downstream surfaces of each of said plurality of segments is contoured to permit a selective extension of said segments radially and in an upstream direction from said jet engine assembly and a retraction of said segments to a position flush with an interior surface of said jet engine assembly.

5. An apparatus according to claim 4 wherein said jet engine assembly comprises a jet engine power section having an entrance lip and an exhaust end, and wherein said plurality of segments is movably mounted at said entrance lip of said power section.

6. An apparatus according to claim 4 wherein said jet engine assembly comprises a jet engine power section having an entrance lip and an exhaust end and an ejector mounted to the rear end of said engine, said ejector having an entrance lip and an exhaust end and wherein said plurality of segments is movably mounted at said entrance lip of said ejector.

7. An apparatus according to claim 6 wherein the length and diameter of said ejector is such that said exhaust end of said ejector is upstream of a line along which the resultant velocity of exhaust gases and entrained air in said ejector in a direction normal to the longitudinal axis of said ejector is substantially zero.

8. In a jet engine assembly, apparatus for providing thrust augmentation in the direction of motion comprising:
    controlled movable airfoil segments arranged annularly about the longitudinal axis of said jet engine assembly for developing a force vector having components in the radial and forward directions;
    a differential pressure cell for detecting the difference in pressure between the upstream and downstream surfaces of said airfoil; and
    a servo mechanism responsive to the output of said differential pressure cell, for moving said airfoil segments to maximize the magnitude of said pressure difference and thus said thrust augmentation.

9. A method for reducing the noise output of a jet engine comprising the following steps:
    attaching a movable airfoil having upstream and downstream surfaces relative to the forward direction of said jet engine at the inlet of said jet engine to entrain air into said inlet;
    arranging said airfoil such that a component of the force vector generated by said airfoil in cooperation with said air stream is coincident with the forward direction of said jet engine;
    adjusting the angle of attack of said airfoil to maximize the pressure differential between the upstream and downstream surfaces; and
    reducing the throttle setting of said jet engine so that the total thrust generated now equals the thrust of said engine without benefit of said airfoil.

* * * * *